United States Patent [19]
Wei

[11] Patent Number: 5,947,877
[45] Date of Patent: Sep. 7, 1999

[54] TOOL SHIFT DEVICE IN A COMPUTER MACHINE

[76] Inventor: Sun Ho Wei, No. 19, Alley 28, Lane 851, Chung Shan Road, Shen Kang Hsiang, Taichung Hsien, Taiwan

[21] Appl. No.: 09/088,663

[22] Filed: Jun. 2, 1998

[30] Foreign Application Priority Data

Dec. 19, 1997 [TW] Taiwan .................................. 86221076

[51] Int. Cl.⁶ .................................................. B23Q 3/155
[52] U.S. Cl. ................................ 483/29; 483/28; 483/59; 483/62
[58] Field of Search ................................ 483/24, 28, 29, 483/59, 60, 62, 65, 66, 67

[56] References Cited

U.S. PATENT DOCUMENTS

| | | | |
|---|---|---|---|
| 4,335,500 | 6/1982 | Munekata et al. | 483/59 |
| 4,437,224 | 3/1984 | Bredeow et al. | 283/28 |
| 5,554,087 | 9/1996 | Hwang et al. | 483/62 |
| 5,704,885 | 1/1998 | Lee | 483/62 |

FOREIGN PATENT DOCUMENTS

| | | | |
|---|---|---|---|
| 356830 | 3/1990 | European Pat. Off. | 483/60 |
| 2366097 | 6/1978 | France | 483/62 |

Primary Examiner—Daniel W. Howell
Assistant Examiner—Christopher Kirkman
Attorney, Agent, or Firm—Bacon & Thomas, PLLC

[57] ABSTRACT

A tool-shifting device includes a disk having a groove defined therein and a ring member is rotatably mounted to a first side of the disk. A plurality of sockets are pivotally connected to the ring member and each have a part received in the groove. The disk has a cutout communicating with the groove and a carrier movably disposed to a second side thereof, the carrier having a protrusion movably retained in a curved recess of a board which is pivotally disposed to the second end of the disk and actuated by a hydraulic cylinder. The socket removed to the cutout will be engaged with the carrier which is then moved along the curved recess of the board which is pivoted by the hydraulic cylinder. The part of the socket engaged with the carrier is then moved upwardly about a position where the socket is pivotally connected to the ring member so that an orientation of a tool received in the socket is changed with respect to the ring member.

6 Claims, 6 Drawing Sheets

TOOL SHIFT DEVICE IN A COMPUTER MACHINE

FIELD OF THE INVENTION

The present invention relates to a tool-shifting device, and more particularly to a tool-shifting device in a cutting machine. The tools are received in respective sockets which are actuated by the device to move along a curved path between two positions so as to be moved smoothly before the tools are taken by other mechanism to process an object.

BACKGROUND OF THE INVENTION

A cutting machine involves a complicated structure which includes many different mechanisms including at least a tool-shifting device to shift a desired tool to a desired position ready to be taken by a tool catching device which removes the tool caught from the tool-shifting device to process an object to be cut. Conventionally, the tool-shifting device comprises a plurality of tools which are respectively received in the respective sockets disposed in the cutting machine. During the cutting processes, different cutting conditions require a specified tool or knife which will be caught by the catching device from the sockets and removed to the desired position. The catching device uses a hydraulic cylinder to complete the movement of the tool. However, the cylinder rod of the hydraulic cylinder cannot stop soft if the cylinder rod is actuated at a certain speed, this situation will damage the tool because of the inertial force of the cylinder rod. That is to say, the inertial force could cause the tool to hit other parts adjacent thereto and, furthermore, a large noise will be produced.

The present invention intends to provide a tool-shifting device which shifts the socket together with the socket along a curved path.

The present invention provides a tool-shifting device includes a disk, a ring with a plurality of sockets pivotally thereto which are moved along the periphery of the disk, a carrier movably disposed to the disk and selectably engaged with one of the sockets and is cooperated with a board driven by a hydraulic cylinder, wherein the carrier is moved along a curved path in the board so that the socket in moved by gradually reducing its speed. This will mitigate and/or obviate the disadvantage of the conventional tool-shifting device.

SUMMARY OF THE INVENTION

In accordance with one aspect of the present invention, there is provided a tool-shifting device comprising a disk having a groove defined in a first side of a periphery thereof and a cutout defined through the periphery and located at a lower portion thereof, the groove communicating with the cutout. A carrier is movably disposed to a second side of the disk and has a pawl means disposed thereto which extends in the cutout. A protrusion extends from the carrier and toward a direction opposite to the first side of the disk.

A board is pivotally disposed to the second side of the disk and has a curved recess defined therein in which the protrusion is movably received. A ring member is co-axially and rotatably mounted to the first side of the disk and has at least one base formed to a periphery thereof. The base has a socket pivotally disposed thereto at first part thereof and a second part of the socket is retained in the groove of the disk. The second part will be engaged to the pawl means when the second part is moved to the cutout of the disk.

A hydraulic cylinder has its cylinder rod connected to a side of the board so that the board is pivoted about a position where the board is pivotally disposed to the disk so that the carrier will be brought upwardly by the protrusion moving in the curved recess so that the rocket is pivoted about the first part thereof.

Other objects, advantages, and features of the present invention will become apparent from the following detailed description with appropriate reference to the accompanying drawings.

DETAILED DESCRIPTION OF THE PREFERRED EMBODIMENT

Figure 1:
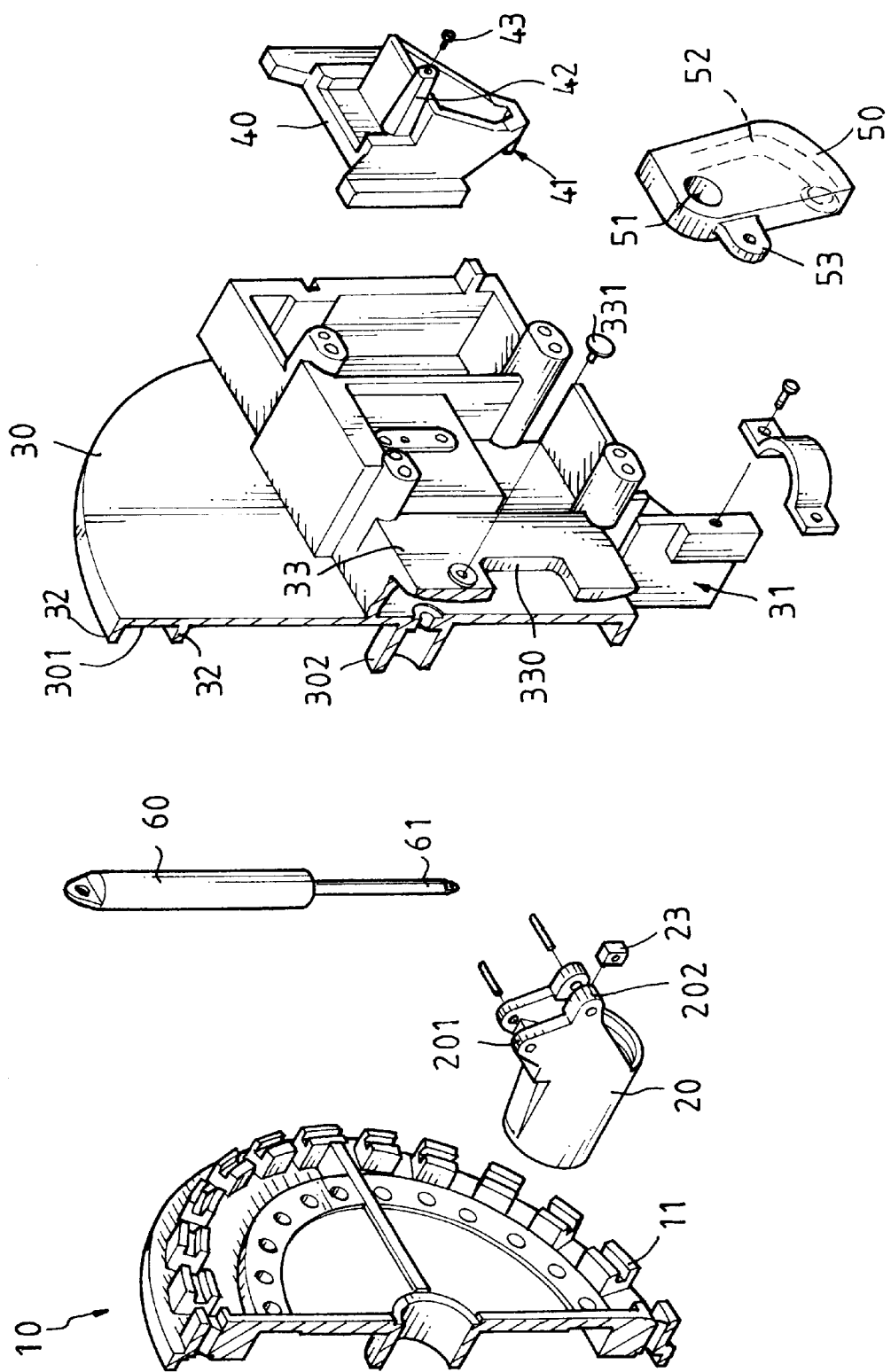
FIG. 1 is an exploded view of a tool-shifting device in accordance with the present invention.

In order to understand the present invention, reference is made to FIGS. 1 through 4, a tool-shifting device in accordance with the present invention comprising a disk 30 having two flanges 32 extending from a periphery of a first side thereof so as to define a groove 301 between the two flanges 32. A cutout 31 is defined through the periphery and located at a lower portion thereof, the groove 301 communicating with the cutout 31. A central tube 302 extending centrally from the first side of the disk 30. A casing 33 is disposed to the second end of the disk 30 and has a first wheel 331 disposed thereto, the casing 33 further having an aperture 330 defined therethrough.

A carrier 40 is movably received in the casing 33 and has a pawl means 41 disposed thereto which extends in the cutout 31. A protrusion 42 extends from the carrier 40 and toward a direction opposite to the first side of the disk 30, the protrusion 42 extending through the aperture 330 and having a second wheel 43 disposed to a distal end thereof. The pawl means 41 of the carrier 40 has two lips 410, a distance between the two lips 410 is the same of that between the flanges 32. A board 50 has a hole 51 defined in an upper portion thereof so as to receive the first wheel 331 therein such that the board 50 is pivotally disposed to the casing 33. The board 50 has a curved recess 52 defined therein in which the second wheel 43 on the protrusion 42 is movably received. A plate 53 extends laterally from the board 50 so as to be connected a cylinder rod 61 of a hydraulic cylinder 60.

Figure 2:
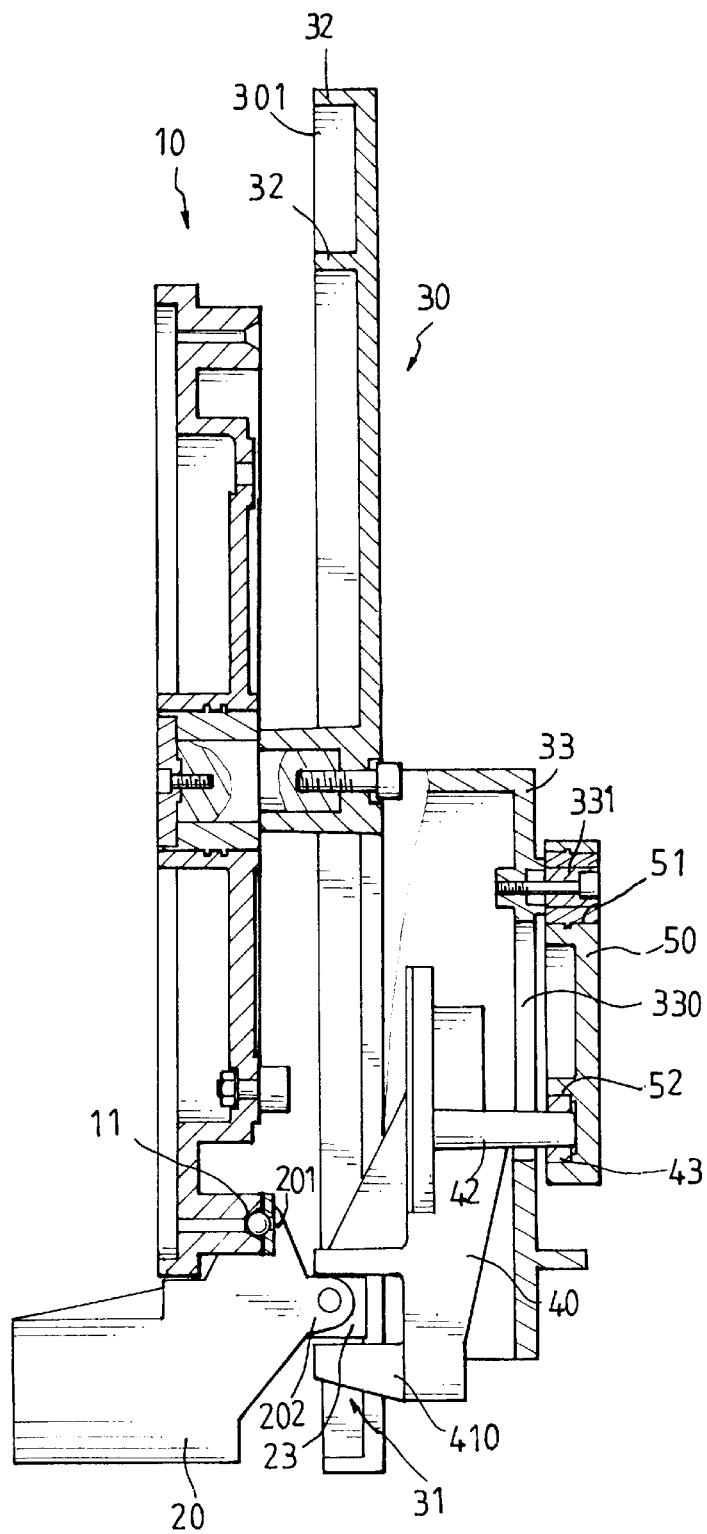
FIG. 2 is a side elevational view, partly in section, of the tool-shifting device in accordance with the present invention.
Figure 3:
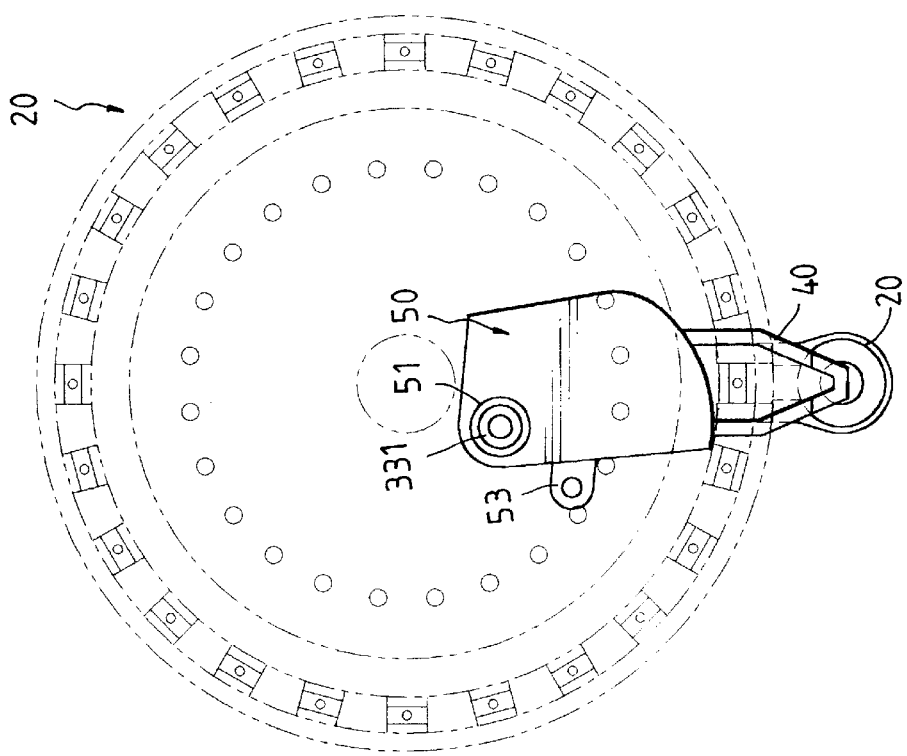
FIG. 3 is an illustrative view to illustrate the tool-shifting device seen from a second side of a disk thereof.
Figure 4:
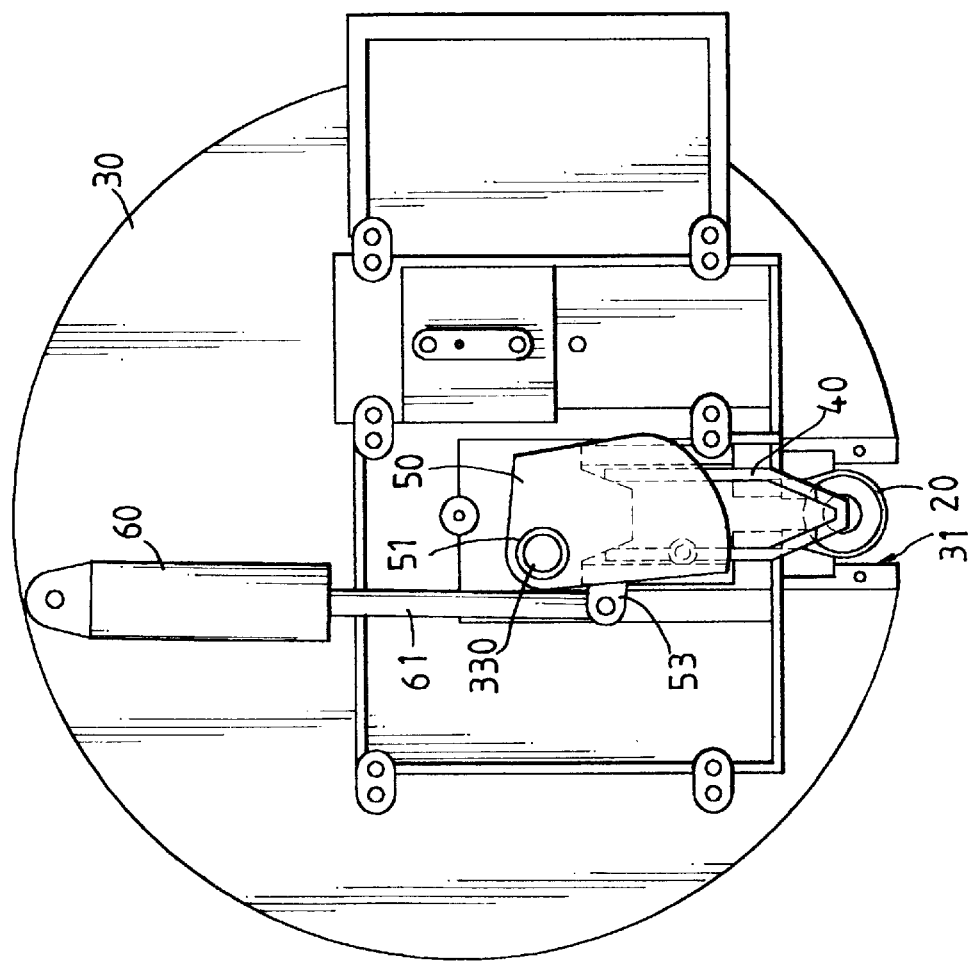
FIG. 4 is an illustrative view to show the relationship between the socket, the board, the carrier and the hydraulic cylinder of the device of the present invention.
Figure 5:
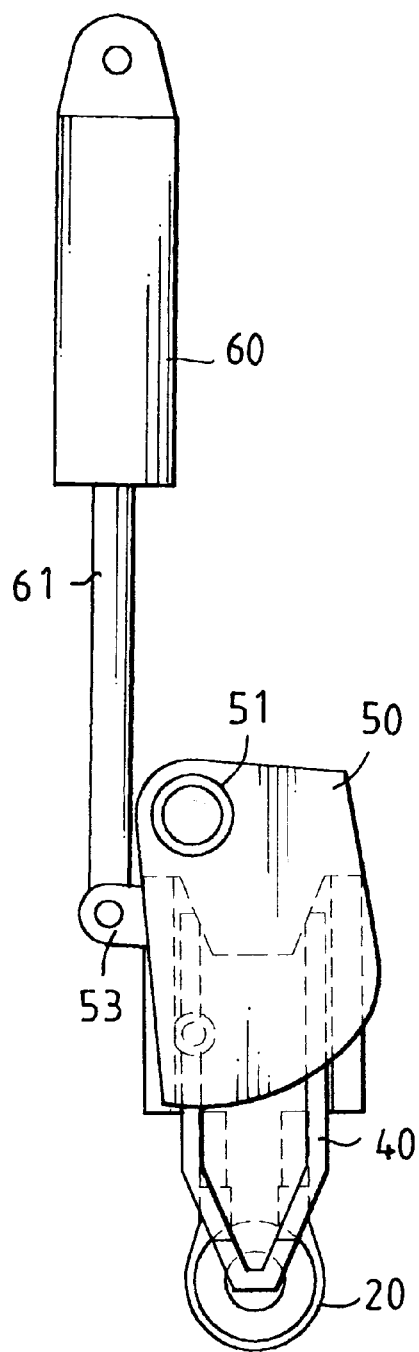
FIG. 5 is an illustrative view to show the device when the hydraulic cylinder is not yet actuated.

A ring member 10 is co-axially and rotatably mounted to the tube 302 of the first side of the disk 30 and has a plurality of bases 11 formed to a periphery thereof. Each of the bases 11 has a slit defined therein. A plurality of sockets 20 each have a first part with two first lugs 201 pivotally connected to a respective one of the bases 11, and a second part with two second lugs 202 retained in the groove 301 of the disk 30 with a block 23 disposed between the two second lugs 202. The block 23 is moved along the groove 301 when the ring 10 is rotated and will be engaged to the pawl means 41 when the second part is moved to the cutout 31 of the disk 30. When the block 23 is moved in the cutout 31 and the hydraulic cylinder 60 is not yet actuated, the socket 20 is maintained in a horizontal position as shown in FIGS. 2, 3 and 4.

Figure 6:
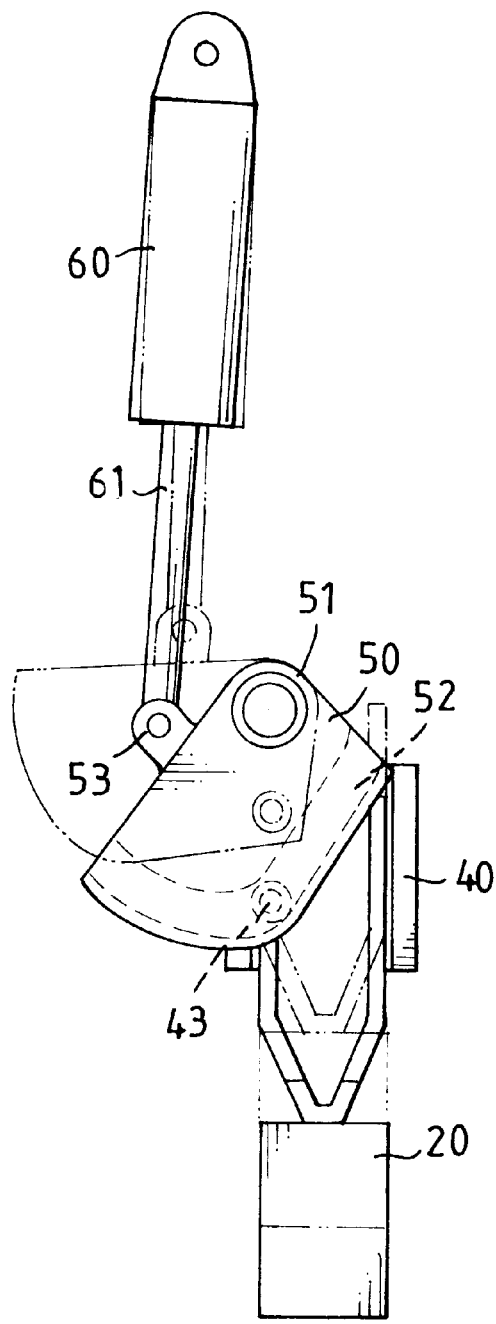
FIG. 6 is an illustrative view to show the device when the hydraulic cylinder is actuated to pivot the board upwardly.

When a certain socket 20 is chosen and a tool or knife (not shown) received in the socket 20 is to be caught by a catching means (not shown), the cylinder rod 61 is retracted and pivot the board 50 about an axis of the first wheel 331. The protrusion 42 is then moved upwardly along the curved recess 52 as shown in FIG. 6. The movement of the carrier 40 pivots the socket 20 about the first part so that the socket 20 is turned to a vertical position so that the tool or the knife in the socket 20 can be easily caught by the catching means.

Because the pivotal movement of the socket 20 is completed within a curved path so that there will no sudden stop as described in the conventional tool-shifting device. Therefore, the tool or the knife is prevented from impact with other parts.

Other advantages and features of the present invention should be clear to those skilled in the art that many modifications may be made without departing from the scope and spirit of the present invention.

What is claimed is:

1. A tool-shifting device comprising:

a disk having a groove defined in a first side of a periphery thereof and a cutout defined through said periphery and located at a lower portion thereof, said groove communicating with said cutout;

a carrier movably disposed to a second side of said disk and having a pawl means disposed thereto which extends in said cutout, a protrusion extending from said carrier and toward a direction opposite to said first side of said disk;

a board pivotally disposed to said second side of said disk and having a curved recess defined therein in which said protrusion is movably received;

a ring member co-axially and rotatably mounted to said first side of said disk and having at least one base formed to a periphery thereof;

at least one socket having a first part pivotally connected to said base and a second part retained in said groove of said disk, said second part being engaged to said pawl means when said second part is moved to said cutout of said disk, and a hydraulic cylinder having its cylinder rod connected to a side of said board so that said board is pivoted about a position where said board is pivotally disposed to said disk.

2. The tool-shifting device as claimed in claim 1, wherein said second part of said socket includes two lugs between which a block is received.

3. The tool-shifting device as claimed in claim 2, wherein said pawl means of said carrier has two lips so as to receive said block therebetween.

4. The tool-shifting device as claimed in claim 1, wherein said protrusion has a wheel disposed to a distal end thereof.

5. The tool-shifting device as claimed in claim 1 further comprising a casing disposed to said second side of said disk and said casing having a wheel disposed thereto which is rotatably retained in a hole defined in said board at said position wherein said board is pivotally disposed to said disk.

6. The tool-shifting device as claimed in claim 5, wherein said casing has an aperture defined therethrough and said carrier is received in said casing with said protrusion movably extending through said aperture.

\* \* \* \* \*